United States Patent [19]

Hoel

[11] Patent Number: 5,491,207
[45] Date of Patent: Feb. 13, 1996

[54] PROCESS OF PRODUCING HIGH MOLECULAR WEIGHT ETHYLENE-α-OLEFIN ELASTOMERS WITH AN INDENYL METALLOCENE CATALYST SYSTEM

[75] Inventor: Elvin L. Hoel, Westfield, N.J.

[73] Assignee: Exxon Chemical Patents Inc., Linden, N.J.

[21] Appl. No.: 166,758

[22] Filed: Dec. 14, 1993

[51] Int. Cl.[6] ............................................. C08F 4/64
[52] U.S. Cl. ...................... 526/129; 526/160; 526/348.6; 526/904; 502/120; 502/152
[58] Field of Search .................................. 526/129, 160, 526/904

[56] References Cited

U.S. PATENT DOCUMENTS

| | | | |
|---|---|---|---|
| 4,808,561 | 2/1989 | Welborn, Jr. | 502/104 |
| 4,871,705 | 10/1989 | Hoel | 502/117 |
| 4,874,734 | 10/1989 | Kioka et al. | 502/104 |
| 4,923,833 | 5/1990 | Kioka et al. | 502/9 |
| 5,001,205 | 3/1991 | Hoel | 526/128 |
| 5,006,500 | 4/1991 | Chang | 502/107 |
| 5,026,797 | 6/1991 | Takahashi | 526/124 |
| 5,087,788 | 2/1992 | Wu | 585/512 |
| 5,124,418 | 6/1992 | Welborn, Jr. | 526/114 |
| 5,153,157 | 10/1992 | Hlatky et al. | 502/117 |
| 5,240,894 | 8/1993 | Burkhardt et al. | 502/108 |

FOREIGN PATENT DOCUMENTS

| | | |
|---|---|---|
| 0128046A1 | 6/1984 | European Pat. Off. . |
| 0206794A1 | 6/1986 | European Pat. Off. . |
| 0287666A1 | 9/1987 | European Pat. Off. . |
| 0295312A1 | 12/1987 | European Pat. Off. . |
| 0277004A1 | 1/1988 | European Pat. Off. . |
| 0277003A1 | 1/1988 | European Pat. Off. . |
| 0294942A1 | 5/1988 | European Pat. Off. . |
| 0285443A1 | 10/1988 | European Pat. Off. . |
| 0295312 | 12/1988 | European Pat. Off. . |
| 0279863B1 | 10/1992 | European Pat. Off. . |
| 62-119215 | 5/1987 | Japan . |
| 62-121709 | 6/1987 | Japan . |
| 62-121707 | 6/1987 | Japan . |

| | | |
|---|---|---|
| WO92/25591 | 12/1993 | WIPO . |
| WO94/11406 | 5/1994 | WIPO . |

OTHER PUBLICATIONS

"Liquid Chromatography of Polymers & Related Materials III", J. Cazes Editor, Marcel Dekker 1981, p. 207.

*Primary Examiner*—David W. Wu
*Attorney, Agent, or Firm*—Darrell E. Warner

[57] ABSTRACT

Disclosed is a process for preparing high molecular weight ethylene-α-olefin elastomers, preferably an ethylene-propylene elastomer, by liquid phase polymerization of the requisite monomers in the presence of a metallocene/alumoxane catalyst complex. Preferably, the process is carried out as a slurry polymerization utilizing the metallocene/alumoxane catalyst in supported form on a silica gel support with the α-olefin monomer maintained in liquid state and used in excess to serve as a polymerization diluent. The metallocene component of the catalyst by which the process is practiced is of the formula:

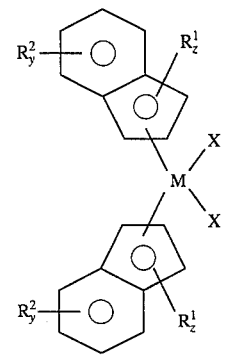

wherein M is zirconium, titanium or hafnium; $R^1$ and $R^2$ are independently a $C_1$–$C_{20}$ linear, branched or cyclic alkyl group; X an alkyl, aryl, halide, hydride or oxygen bridge of a zirconocene dimer; "y" and "z" are independently numbers 0, 1 or 2; and M is preferably zirconium. Most preferably, the supported zirconocene/alumoxane catalyst is prepolymerized with ethylene or another olefin to provide spherical, free-flowing catalyst particles which give free-flowing particulate elastomer product from the slurry polymerization.

16 Claims, 3 Drawing Sheets

PROCESS OF PRODUCING HIGH MOLECULAR WEIGHT ETHYLENE-α-OLEFIN ELASTOMERS WITH AN INDENYL METALLOCENE CATALYST SYSTEM

FIELD OF THE INVENTION

This invention relates to a process for preparing high molecular weight ethylene-α-olefin elastomers, preferably an ethylene-propylene elastomer, by liquid phase polymerization of the requisite monomers in the presence of a zirconium, titanium, or hafnium metallocene/alumoxane catalyst system. Preferably, the process is carried out as a slurry polymerization utilizing a zirconocene/alumoxane catalyst in supported form on a silica gel support with the α-olefin monomer maintained in liquid state and used in excess to serve as a polymerization diluent. Most preferably, the supported zirconocene/alumoxane catalyst is prepolymerized with ethylene or another olefin to provide spherical, free-flowing catalyst particles which give free-flowing particulate elastomer product from the slurry polymerization.

BACKGROUND OF THE INVENTION

As is well known to those skilled in the art, various processes and catalysts exist for the homopolymerization or copolymerization of α-olefins. For example, processes are known for polymerizing ethylene or propylene, either alone or in the presence of small quantities of other monomers, to produce plastics. These plastics are typically used in such applications as blow and injection molding, extrusion coating, film and sheeting, pipe, wire and cable. Also for example, it is well known to copolymerize ethylene, propylene, and optionally a third monomer such as non-conjugated dienes, to make elastomers. Ethylene-propylene elastomers find many end-use applications due to their resistance to weather, good heat aging properties and their ability to be compounded with large quantities of fillers and plasticizers. Typical automotive uses are radiator and heater hose, vacuum tubing, weather stripping and sponge doorseals. Typical industrial uses are for sponge parts, gaskets and seals.

Due to their different properties and end uses, it is important to distinguish between those factors affecting elastomeric or plastic properties of α-olefin polymers. While such factors are many and complex, a major one of instant concern is that related to sequence distribution of the monomers throughout the polymer chain.

For polyolefin plastics, sequence distribution is of little consequence in determining polymer properties since primarily one monomer is present in the chain. Accordingly, in plastic copolymers the majority monomer will be present in the form of long monomeric blocks.

While sequence distribution is thus of little concern with respect to polymeric plastics, it is a critical factor to be considered with respect to elastomers. If the olefinic monomers tend to form long blocks which can crystallize, elastic properties of the polymer are poorer than in a polymer with short monomer sequences in the chain.

Titanium catalysts, which can produce stereoregular propylene sequences, are particularly disadvantageous since creating blocks of either ethylene or propylene will lead to crystallinity in the elastomer.

At a given comonomer composition, sequence distribution is primarily a function of the catalyst components chosen. It can thus be seen that the artisan must exercise extreme care in selecting a catalyst system for making elastomers, with their critical dependency on sequence distribution and stereoregularity. It can also be seen that, on the other hand, no such restrictions apply to the selection of a catalyst system for making plastic polymer.

To avoid crystallinity in copolymers, it is also necessary to use a catalyst that produces a material with a narrow compositional distribution so that fractions containing a high content of one monomer are not present. Furthermore, when making ethylene-α-olefin copolymers it is well known that the α-olefin may act as a chain transfer agent. For essentially crystalline copolymers with low α-olefin content, the molecular weight modifying effect of the α-olefin may be insignificant. However, when making copolymers with compositions in the elastomer range, catalysts that give high molecular weight plastic copolymers may produce low molecular weight polymers unsuitable for elastomer applications. In a similar fashion, undesirable molecular weight distribution changes can occur or the compositional distribution can change. Furthermore, commercially useful plastics of polyethylene or polypropylene types need not have as high a molecular weight as commercially useful elastomers of ethylene-α-olefin type.

In view of the complicated and poorly understood relationship between polymer composition and catalyst performance, it is difficult for the artisan to predict the behavior of a catalyst for the production of an elastomer if it has only been used previously to make plastic homo- or copolymers.

European Patent Application 206,794 discloses that certain supported metallocene/alumoxane complexes, particularly bis(cyclopentadienyl) transition metal metallocenes, in which the cyclopentadienyl ligands are unsubstituted or substituted with alkyl groups and may be bridged by an alkylene or a silanylene group, are useful for polymerizing ethylene to a homopolymer or to a copolymer with an α-olefin for purposes of modifying the clarity or impact properties of the polyethylene polymer product.

The art has also indicated that amorphous ethylene-propylene copolymers (EPC) may be produced by metallocene/alumoxane catalyst systems in which the metallocene component is a particular species of metallocene. As used herein the term "EPC" means a copolymer of ethylene and an α-olefin (not necessarily propylene) which exhibits the properties of an elastomer as defined in ASTM D1566 under rubber. However, prior to the work reported herein and in U.S. Pat. Nos. 4,571,705 and 5,001,205, the ethylene-propylene copolymers so produced have been too low in molecular weight to be suitable for use as a commercial elastomeric material, especially when the elastomer has more than 20 wt % incorporated propylene. Also, the activities of the catalysts employed have been too low for production of products with low residues of catalyst in a reasonable time.

In European Patent Application 128,046 it is indicated that an alumoxane complex with dimethylsilanylenedicyclopentadienyl zirconium dichloride or bis(cyclopentadienyl) titanium diphenyl will catalyze production of a low molecular weight EPC, and that such catalyst complexes may be employed in conjunction with other distinct metallocene/alumoxane catalyst complexes to produce reactor blends of an EPC with high density polyethylene (HDPE) and linear low density polyethylene (LLDPE) such as, HDPE/EPC, LLDPE/EPC, HDPE/LLDPE/EPC reactor blends or the like. The EPC component of the blends so produced—which by itself by reason of its low molecular weight is not a commercially useful elastomer—is useful in the context of a modifier blend component for the base HDPE or LLDPE with which it is coproduced.

Japanese Kokai numbers 62-119,215; 62-121,707; and 62-121,709 disclose production of soft copolymers variously of ethylene-α-olefin, propylene-α-olefin, butylene-α-olefin, using a metallocene/alumoxane catalyst complex wherein the metallocene is a metal salt of a lower alkylene bridged-bis(cyclopentadienyl), -bis(indenyl) or -bis(tetrahydroindenyl) compound. The Japanese Kokai represent that copolymer products may be produced by a gas or liquid phase reaction procedure to have a wide range of properties such as crystallinities from 0.5–60%, while having a molecular weight distribution (MWD) less than 3 with low levels of boiling methyl acetate soluble components. The Japanese Kokai represent that such copolymerization may be carried out in the presence of such catalysts at temperatures from −80° to 50° C. under pressures ranging from ambient to 30 kg/cm$^2$. Yet in the examples of the first two Japanese Kokai, which illustrate actual production of such materials, the reaction conditions illustrated are temperatures of −10° to −20° C. at reaction times of from 5 to 30 hours using solution polymerization with toluene as the solvent. A process as illustrated by the operating examples of the first two Japanese Kokai is not attractive from a standpoint of commercial production since the long reaction times, low temperatures and need to separate polymer product from the reaction solvent impose severe increases in production cost of the resulting copolymer material. The process of Japanese Kokai 62-121,709 is also unattractive for commercial production due to the use of toluene as a solvent and the expense of separating and recycling the large volume of solvent.

A number of European Patent applications have recently appeared which describe specific forms of metallocene/alumoxane catalysts useful for ethylene and supported and prepolymerized ethylene-α-olefin polymerization. See European Patent Application Publication Nos. 0279863; 0287666; 0285443; 0294942; and 0295312. Each identifies as examples of metallocenes which may be utilized in the preparation of a supported form of metallocene/alumoxane catalyst a broad list of zirconocenes, titanocenes and hafnocenes, among which are a few species, bridged and unbridged, of bis(indenyl) metallocenes. The examples of each illustrate the supported catalyst, which may be in prepolymerized form, only with reference to bis(cyclopentadienyl) transition metal components. From the information presented, it would appear that the described supported catalyst compositions are limited to the production of plastics and, whether or not in prepolymerized form, would not be suitable to the production of a commercially useful ethylene-α-olefin elastomer.

For an EPC elastomer to be considered to have commercially acceptable properties, it should have a Mooney viscosity (ML$_{1+4}$ at 125° C.) no less than 10, a weight-average molecular weight no less than 100,000, a glass transition temperature below −40° to −60° C. and a degree of crystallinity no greater than 25%. Desirably, such EPC elastomer should also have a molecular weight distribution characterized by the ratio of weight-average to number-average molecular weights of 5 or less. The range of reaction conditions most economical, hence commercially viable for practice, under which EPC elastomers should be produced is a reaction temperature ranging from 0° to 80° C. at reaction residence times of from 30 minutes to 6 hours. Desirably, the reaction conditions should minimize or eliminate the number of extrinsic treatment steps needed to isolate the polymer product in final marketable form. Hence, it is desirable for the production method to employ as a reaction diluent one or more of the monomers rather than an inert solvent from which the polymer product must later be separated. It is also desirable that the product be produced in granular form in the slurry reactor for ease of isolation and subsequent processing. Finally, it is desirable that the catalyst be sufficiently active that deashing from the product is not needed. Preferably, the catalyst productivity should be greater than 500 grams of polymer per gram of ash (catalyst and cocatalyst residues) per hour. More preferably, the productivity should be greater than 1000 grams of polymer per gram of ash per hour; and most preferably, the productivity should be greater than 2000 grams of polymer per gram of ash per hour.

Before the discovery described in my U.S. Pat. No. 4,871,705 that highly substituted bis(cyclopentadienyl) Group IVB transition metal compounds, particularly bis(tetrahydroindenyl) and more preferably bridged bis(tetrahydroindenyl) Group IVB metal compounds, can be used with an alumoxane in a supported form of catalyst to produce EPC elastomers of commercially acceptable properties, the production of EPC elastomers with a metallocene/alumoxane catalyst under conditions suitable for commercial practice had not been demonstrated. As my U.S. Pat. No. 4,871,705 describes, supported bis(tetrahydroindenyl) Group IVB metal compounds are a class of metallocenes that have been found to be particularly useful in forming a catalyst system which is commercially useful for production of EPC elastomers.

Nevertheless, it is still desirable to develop catalyst systems, particularly metallocene-alumoxane catalysts, with which EPC elastomers may be produced under conditions suitable for commercial practice wherein the expense associated with catalyst production is reduced compared to that required for production of a bis(tetrahydroindenyl) Group IVB metal compound based catalyst systems.

SUMMARY OF THE INVENTION

The invention comprises a process employing a metallocene/alumoxane catalyst system in which the metallocene is a specific class of zirconocene, titanocene or hafnocene which provides for the production of high molecular weight ethylene-α-olefin elastomers under reaction conditions suitable for commercial practice. Employment of one of the specified metallocenes, preferably a zirconocene, in the metallocene/alumoxane catalyst in a slurry reaction process results in the production of high molecular weight ethylene-α-olefin elastomers which typically have a low ash content (where ash refers to the catalyst and cocatalyst residue in the polymer), so that deashing is not required.

The metallocene component of the metallocene/alumoxane catalyst system employed in the practice of the process of this invention is a bis(indenyl) group IVB transition metal of the following formula:

wherein M is zirconium, titanium or hafnium; $R^1$ and $R^2$ are each the same or different $C_1$–$C_{20}$ linear, branched or cyclic alkyl group; X is an alkyl, aryl, halide, hydride or oxygen bridge of a metallocene dimer; and "y" and "z" are integer numbers 0, 1 or 2. The most preferred catalysts are those wherein M is zirconium.

Utilizing the defined metallocene in the metallocene/ alumoxane catalyst with which the process is practiced, the process may be practiced with the catalyst in non-supported form by adding the metallocene and alumoxane in hydrocarbon solutions to the polymerization diluent. Preferably, the metallocene/alumoxane catalyst system is used in a heterogeneous form on a catalyst support, such as a silica gel support, and polymerization is carried out by a slurry polymerization technique in which an α-olefin monomer is used in excess and maintained in the liquid state to serve as the polymerization diluent. Most preferably, the supported metallocene/alumoxane catalyst is prepolymerized with ethylene or an α-olefin to control EPC granule size and size distribution for the direct production of granular EPC products from the slurry process.

DESCRIPTION OF THE PREFERRED EMBODIMENTS

This invention relates to a process for producing in high yield EPC elastomers of high molecular weight, low crystallinity, and low ash. In particular, it relates to a catalyst system comprising an indenyl metallocene/alumoxane complex which is highly active for the production of high molecular weight EPC elastomers in a slurry polymerization process.

As used herein the term "EPC" means a copolymer of ethylene and an α-olefin, not necessarily propylene, which exhibits the properties of an elastomer. The α-olefins suitable for use in the preparation of elastomers with ethylene are preferably $C_3$–$C_{16}$ α-olefins. Illustrative non-limiting examples of such α-olefins are propylene, 1-butene, 1-pentene, 1-hexene, 1-octene and 1-dodecene. If desired, more than one α-olefin may be incorporated.

The EPC elastomers may contain about 20 up to about 90 weight percent ethylene, more preferably about 30 to 85 weight percent ethylene, and most preferably about 35 to about 80 weight percent ethylene.

The catalyst employed in the method of this invention is a bis(indenyl) metallocene/alumoxane system wherein the bis(indenyl)metallocene component of the catalyst system is of the formula:

wherein M is zirconium, titanium or hafnium; each $R^1$ and $R^2$ are the same or different and is a linear or branched hydrocarbyl radical having from one to twenty carbon atoms; each X is the same or different and is alkyl, aryl, hydride, halide or oxygen bridge of a metallocene dimer; and "y" and "z" are integer numbers from 0 to 2. The metallocene is preferably a zirconocene, that is M is zirconium. Exemplary $R^1$ hydrocarbyl radicals are methyl, ethyl, propyl, butyl, amyl, isoamyl, isoamyl, hexyl, isobutyl, heptyl, octyl, nonyl, decyl, cetyl, 2-ethylhexyl, phenyl, and the like.

The alumoxane component of the catalyst system is an oligomeric aluminum compound represented by the general formula $(R{-}Al{-}O)_{n+2}$, which is a cyclic compound, or $R(R{-}Al{-}O{-})_n AlR_2$, which is a linear compound. In the general alumoxane formula R is a $C_1$–$C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water in the form of a moist inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

The catalyst employed in the method of the invention comprises a complex formed upon admixture of a metallocene, preferably a zirconocene, as specified, with an alumoxane. The catalyst complex may be prepared as a non-supported catalyst by addition of the requisite metallocene and alumoxane to an inert solvent in which polymerization can be carried out by solution polymerization procedures or concentrated solutions of the metallocene and alumoxane may be used in a slurry polymerization process. In the context of the present invention the catalyst complex is preferably prepared and employed as a heterogeneous catalyst by adsorbing and complexing the requisite metallocene and alumoxane components on a catalyst support material such as silica gel, alumina or other suitable inorganic support material. The heterogeneous form of catalyst system is employed in a suspension or slurry polymerization procedure. For the production of EPC elastomers in accordance with the method of this invention, it is preferred to utilize the α-olefin monomers in liquified state as the polymerization diluent. As a practical limitation, slurry polymerization takes place only in solvents which are not solvents for the product. This limits the choice of α-olefin solvent to those with less than 5 carbon atoms.

The support material for preparing a heterogeneous catalyst may be any finely divided inorganic solid porous support, such as talc, silica, alumina, silica-alumina or mixtures thereof. Other inorganic oxides that may be employed either alone or in combination with silica or silica-alumina are magnesia, titania, zirconia, and the like. The inorganic oxides should be dehydrated, as is well known in the art, to remove water and most of the surface hydroxyl groups. The residual surface hydroxyl groups in the inorganic solid porous support may be removed by reaction with agents such as lithium alkyls, silyl chlorides, aluminum alkyls, or preferably with alumoxane, thus producing surface bound alumoxane. Hence, a preferred catalyst support is a dehydrated inorganic oxide treated with an alumoxane, more preferably methylalumoxane. A suitable support material is a dehydrated silica gel treated with methylalumoxane. The normally hydrocarbon soluble metallocene and alumoxane are prepared as a heterogeneous supported catalyst by deposition on a support material, such as a dehydrated silica gel. The silica gel may be prepared in dehydrated form by heating or otherwise treating it to remove its water content or to convert same to a derivate which is clement to the formation of the metallocene/alumoxane catalyst complex. The residual surface hydroxyl groups can be removed by reaction with alumoxane, thus producing surface bound alumoxane. A suitable silica gel would have a particle diameter in the range 1–600 microns, preferably 10–100 microns; a surface area of 50–1000 $m^2/g$, preferably 100–500 $m^2/g$; and a pore volume of 0.5–3.5 $cm^3/g$. The silica gel may be heat treated at 100°–1000° C., preferably 300°–800° C. for a period of 1–100 hours, preferably 3–24 hours, to insure its use in dehydrated form.

The catalyst complex obtained through contacting of the metallocene and the alumoxane cocatalyst may be formed prior to introduction of these components into the reactor, or, alternatively, it may be formed in the reactor. In the preferred case wherein a zirconocene is employed and the active complex is formed in the reactor, the ratio of alumoxane to zirconocene measured as a mole ratio of Al to Zr is desirably in the range 10–5000, preferably 20–4000 and most preferably 20–1000. In the case that the active complex is formed outside the reactor, the preferred ratio of alumoxane to zirconocene (as Al:Ar) is in the range 1–200, desirably 20–200. In this case, additional alumoxane cocatalyst may be added to the diluent in the reactor so that the total ratio of Al to Zr is in the range 10–5000, preferably 20–4000 and most preferably 20–1000. Likewise, in this case, a small amount of another alkylaluminum compound, such as triethylaluminum or trisobutylaluminum, may be added to the reactor together with, or instead of, additional alumoxane, for the purposes of scavenging any impurities which may be present in the reactor. In all of the above, solutions of the catalyst or cocatalyst may be contacted in the reactor with one of the components present on a suitable support, as described below.

The order of addition of the metallocene and alumoxane to the support material can vary. As stated before, zirconocenes of the specified cases are the preferred metallocenes. Consequently further discussion of the catalyst will be with specific reference to zirconocenes although it should be understood that similar conditions and procedures are applicable to titanocenes and hafnocenes as well.

The zirconocenes (dissolved in a suitable hydrocarbon solvent) can be first added to the support material followed by the addition of the alumoxane; the alumoxane and zirconocene can be added to the support material simultaneously; or the alumoxane can be first added to the support material followed by the addition of the zirconocene. In accordance with the preferred embodiment of this invention, the alumoxane dissolved in a suitable inert hydrocarbon solvent is mixed with the zirconocene solution and the support material is added to this solution.

The treatment of the support material, as mentioned above, is conducted in an inert solvent. The same inert solvent or a different inert solvent is also employed to dissolve the zirconocene and alumoxanes. Preferred solvents include the various hydrocarbons which are liquid at treatment temperatures and pressures and in which the individual ingredients are soluble. Illustrative examples of useful solvents include the alkanes such as propane, butane, pentane, iso-pentane, hexanes, heptanes, octanes and nonanes; cycloalkanes such as cyclopentane and cyclohexane; and aromatics such as benzene, toluene, xylenes, ethylbenzene and diethylbenzene. Sufficient solvent should be employed so as to provide adequate heat transfer away from the catalyst components during reaction and to permit good mixing.

The ingredients can be added to the reaction vessel rapidly or slowly. The temperature maintained during the contact of the reactants can vary widely, such as, for example, from 0° to 100° C. Greater or lesser temperatures can also be employed. The reaction between the alumoxane and the support material is rapid, however, it is desirable that the alumoxane be contacted with the support material for about one half hour up to eighteen hours or greater. Preferably, the reaction is maintained for about one hour at 25°–100° C.

At all times, the individual ingredients as well as the recovered catalyst components must be protected from oxygen and moisture. Therefore, the reactions are performed in an oxygen and moisture free atmosphere and the catalyst is recovered in an oxygen and moisture free atmosphere. Preferably, therefore, the reactions are performed in the presence of an inert dry gas such as, for example, nitrogen. The recovered solid catalyst is maintained in the inert gas atmosphere.

Upon completion of the deposition of the zirconocene and alumoxane on the support, the solid material can preferably be treated with a small amount of monomer, e.g. ethylene, to prepolymerize the solid catalyst materials to a weight increase of at least 50%, desirably from about 100 to about 500% based on the total weight of catalyst and support material. Then the solid material, as such or as prepolymerized, can be recovered by any well-known technique. For example, the solid catalyst material can be recovered from the liquid by filtration, by vacuum evaporation, or by decantation. The solid is thereafter dried under a stream of pure dry nitrogen or dried under vacuum. Prepolymerization of the solid catalyst material aids in obtaining an EPC elastomer produced therefrom in well-defined particle form. Careful rinsing of the prepolymerized catalyst provides the best granular particle form. Prepolymerization also greatly reduces the requirement for alumoxane. For example, an Al:Zr ratio of 1000:1 or greater for alumoxane:zirconocene is needed for high activity when the alumoxane is added to the liquid phase of the reactor, but a ratio less than 100:1 is often sufficient when the alumoxane is incorporated into the prepolymerized catalyst. For a prepolymerized catalyst the ratio of aluminum to zirconium may range from about 1:1 to 500:1, preferably from about 20:1 to 200:1, and high activities will still be obtained.

Most preferably, the supported catalyst is prepared by 1) addition of a solution, toluene for example, of zirconocene to the alumoxane solution and stirring for 5–30 minutes; 2) adding the dry support to the solution and stirring at 25°–80° for 15–60 minutes; 3) removal of toluene by vacuum with heating to leave a dry powder; 4) adding a light hydrocarbon, pentane for example, to slurry the powder; 5) prepolymerizing with ethylene or other olefin in the pentane slurry and then collecting, rinsing and drying the catalyst. For best particle form, it is preferred to add no alumoxane to the reactor beyond what is on the prepolymerized catalyst. Sufficient aluminum alkyl, such as triethylaluminum or triisobutylaluminum, to scavenge impurities in the feeds may be added, but not an excess.

In accordance with the preferred procedure of this invention, an EPC elastomer is produced by slurry polymerization utilizing the α-olefin monomer or mixture of monomers as the polymerization diluent in which a supported zirconocene/alumoxane catalyst system is suspended. Ethylene is added to the reaction vessel in an amount sufficient to produce the desired ethylene content in the EPC product. The differential pressure of ethylene, in excess of the vapor pressure of the α-olefin monomer, required to produce a given ethylene content depends on the structure of the zirconocene used. Generally the polymerization process is carried out at an ethylene differential pressure of from about 0.7 atm to about 70 atm (about 10 to about 1000 psi), most preferably from about 3 atm to about 41 atm (about 40 to about 600 psi); and the polymerization diluent is maintained at a temperature of from about −10° C. to about 100° C.; preferably from about 10° C. to about 70° C., and most preferably from about 20° C. to about 60° C. Under the conditions as above indicated the ethylene and α-olefin monomers copolymerize to an EPC elastomer.

The polymerization may be carried out as a batchwise slurry polymerization or as a continuous slurry polymerization. The procedure of continuous process slurry polymerization is preferred, in which event ethylene, liquid. α-olefin, and catalyst are continuously supplied to the reaction zone in amounts equal to the ethylene, α-olefin, and catalyst removed from the reaction zone, with the EPC polymer, in the product stream.

Without limiting in any way the scope of the invention, one means for carrying out the process of the present invention is as follows: In a stirred-tank reactor liquid propylene monomer is introduced. Feed ethylene gas and hydrogen, if used, are introduced either into the vapor phase of the reactor, or sparged into the liquid phase as well known in the art. The reactor contains a liquid phase composed substantially of liquid propylene together with dissolved ethylene gas, and a vapor phase containing vapors of all monomers and hydrogen, if used. Catalyst and cocatalyst (and/or scavenger aluminum alkyl) are introduced via nozzles in either the vapor or liquid phase. The reactor temperature and pressure may be controlled via reflux of vaporizing α-olefin monomer (autorefrigeration), as well as by cooling coils, jackets etc. The polymerization rate is controlled by the rate of catalyst addition, or by the concentration of cocatalyst manipulated separately. The ethylene content of the polymer product is determined by the zirconocene used and by the ratio of ethylene to propylene in the reactor, which is controlled by manipulating the relative feed rates of these components to the reactor.

The polymer product molecular weight is controlled, optionally, by controlling other polymerization variables such as the temperature, or more desirably by a stream of hydrogen introduced to the gas phase of the reactor, as is well known in the art. Hydrogen is very effective for molecular weight control with these catalysts. Usually, less than 1000 mole ppm is sufficient to provide 10-100 $ML_{1+4}$, 125° C. products, with the precise amount required depending on temperature and pressure in the reactor. In the absence of hydrogen, the catalysts of this invention give products with about 2-3 times the molecular weight obtained with the tetrahydroindenyl catalysts of my U.S. Pat. No. 4,871,705. Surprisingly, we find that use of more TEAL (triethylaluminum) than required for scavenging impurities can also reduce molecular weight as illustrated in the Examples. The polymer product which leaves the reactor is recovered by flashing off gaseous ethylene and propylene at reduced pressure, and, if necessary, conducting further devolatilization in equipment such as a devolatilizing extruder. In a continuous process the residence time of the catalyst in the reactor generally is from about 10 minutes to 12 hours, preferably 20 minutes to 8 hours, and more preferably 30 minutes to 6 hours, and most preferably 30 minutes to 4 hours.

The final properties of the EPC elastomer produced by the process of the invention are related to the zirconocene structure and the reaction conditions, particularly the ethylene/propylene ratio and reaction temperature.

In the Examples which illustrate the practice of the invention the analytical techniques described below were employed for the analysis of the resulting EPC elastomer products The Mooney viscosity, $ML_{1+4}$, 125° C., was measured in a Monsanto Mooney Viscometer according to ASTM D1646. Polymer ethylene content was determined by infrared analysis according to ASTM D3900. Molecular weight determinations for EPC elastomer products were made by gel permeation chromatography (GPC) according to the following technique. Molecular weights and molecular weight distributions were measured using a Waters 150 gel permeation chromatograph equipped with a differential refractive index (DRI) detector and a Chromatix KMX-6 on-line light scattering photometer. The system was used at 135° C. with 1,2,4-trichlorobenzene as the mobile phase. Shodex (Showa Denko America, Inc.) polystyrene gel columns 802, 803, 804 and 805 were used. This technique is discussed in "Liquid Chromatography of Polymers and Related Materials III", J Cazes editor, Marcel Dekker, 1981, p. 207 which is incorporated herein by reference. No corrections for column spreading were employed; however, data on generally accepted standards, e.g. National Bureau of Standards Polyethlene 1484 and anionically produced hydrogenated polyisoprenes (an alternating ethylene-propylene copolymer) demonstrated that such corrections on Mw/Mn were less than 0.05 units. Mw/Mn was calculated from an elution time—molecular weight relationship based on DRI measurements whereas Mz/Mw was evaluated using the light scattering photometer. The numerical analyses were performed using the commercially available Beckman/CIS customized LALLS software in conjunction with the standard Gel Permeation package, run on a HP 1000 computer.

EXAMPLES 1–5

Synthesis of Prepolymerized Catalyst A ([IND]$_2$ZrCl$_2$/MAO/SiO$_2$)

10 g of Davison 948 silica gel (dried at 800° C. for 4 hours) was added slowly to 250 mL of M MAO in toluene (from Ethyl Corporation, reported 1M in aluminum) in a 500 mL flask equipped with a magnetic stir bar. The toluene was removed under vacuum, while heating at 80° C. for 1 hour, to yield 18 g of white powder. To 2 g of the solid residue, magnetically stirred under nitrogen in 50 mL of dry pentane, was added 40 mg of bis(indenyl)zirconium dichloride (INDZ) dissolved in 3 mL of dry toluene. The slurry was then stirred at room temperature for 15 minutes.

With water bath cooling of the reaction flask, ethylene was added at 6 mmol/min for 40 minutes. The powder was then collected on a fritted glass funnel in the dry box, washed five times with 40 mL of dry pentane, and dried. Collected was 7.06 g of prepolymerized catalyst as a tan powder with several larger pieces of polymer from the flask walls. The catalyst was nominally 13 wt % methylalumoxane, 0.57 wt % zirconocene (0.13 wt % Zr), and 71 wt % polyethylene, Since catalyst A was prepolymerized to 346% of its original weight, this is labeled PP(346)INDZ in the Table.

COMPARATIVE EXAMPLES 6–7

Synthesis of Prepolymerized Catalysts B and C
($Me_2Si[THI]_2ZrCl_2$/MAO/$SiO_2$)

To 10 g of Davison 948 silica gel (dried at 800° C. for 4 hours) in a 500 mL flask equipped with a magnetic stir bar, was added 200 mL of 1M MAO in toluene (from Ethyl Corporation, reported 1M in aluminum). The toluene was removed under vacuum, after heating at 80° C. for 1 hour. To 2 g of the solid residue, magnetically stirred under nitrogen in 35 mL Of dry pentane, was added 40 mg of dimethylsilanylene bis(tetra-hydroindenyl)zirconium dichloride (STHIZ) dissolved in 3 mL of dry toluene. The slurry was then stirred at room temperature for 15 minutes.

With water bath cooling of the reaction flask, ethylene was added at 6 mmol/min for 30 minutes. The powder was then collected on a fritted glass funnel in the dry box, washed three times with 30 mL of dry pentane, and dried. Collected was 6.17 g of prepolymerized catalyst B as a tan powder with several larger pieces of polymer from the flask walls. The catalyst was nominally 12 wt % methylalumoxane, 0.65 wt % zirconocene (0.13 wt % Zr), and 67 wt % polyethylene. Since catalyst B was prepolymerized to 302% of its original weight, this is labeled PP(302)STHIZ in the Table. Catalyst C was prepared in a similar manner, was prepolymerized to 330% of its original weight, and is reported as PP(330)STHIZ in the Table.

COMPARATIVE EXAMPLE 8

Synthesis of Prepolymerized Catalyst D
($Me_2Si\ [IND]_2ZrCl_2$/MAO/$SiO_2$)

To 8 g of Davison 948 silica gel (dried at 800° C. for 4 hours) in a 500 mL flask equipped with a magnetic stir bar, was added 200 mL of 1M MAO in toluene (from Ethyl Corporation, reported 1M in aluminum). The toluene was removed under vacuum, after heating at 80° C. for 1 hour, to yield 13 g of MAO/$SiO_2$. To 2 g of the solid residue, magnetically stirred under nitrogen in 35 mL of dry pentane, was added 40 mg of dimethylsilanylene-bis(indenyl)zirconium dichloride (SINDZ) dissolved in 3 mL of dry toluene. The slurry was then stirred at room temperature for 10 minutes.

With water bath cooling of the reaction flask, ethylene was added at 6 mmol/min for 40 minutes. The powder was then collected on a fritted glass funnel in the dry box, washed three times with 30 mL of dry pentane, and dried. Collected was 6.59 g of prepolymerized catalyst D as an orange powder with several larger pieces of polymer from the flask walls. The catalyst was nominally 12 wt % methylalumoxane, 0.61 wt % zirconocene (0.12 wt % Zr), and 69 wt % polyethylene. Since catalyst D was prepolymerized to 323% of its original weight, this is labeled PP(323)SINDZ in the Table.

COMPARATIVE EXAMPLE 9

Synthesis of Prepolymerized Catalyst E
($CH_2CH_2[IND]_{ZrCl2}$/MAO/$SiO_2$)

To 2 g of Davison 948 silica gel (dried at 800° C. for 4 hours) in a 200 mL flask equipped with a magnetic stir bar, was added 50 mL of 1M MAO in toluene (from Ethyl Corporation, reported 1M in aluminum). The toluene was removed under vacuum, after heating at 80° C. for 1 hours, to yield a white solid MAO/$SIO_2$ residue containing about 1.25 g MAO. To this solid residue, magnetically stirred under nitrogen in 50 mL of dry pentane, was added 40 mg of ethylenebis(indenyl)zirconium dichloride (EINDZ) dissolved in 3 mL of dry toluene. The slurry was then stirred at room temperature for 10 minutes.

With water bath cooling of the reaction flask, ethylene was added at 6 mmol/min for 35 minutes. The powder was then collected on a fritted glass funnel in the dry box, washed three times with 30 mL of dry pentane, and dried. Collected was 6.72 g of prepolymerized catalyst E as a light yellow powder with several larger pieces of polymer from the flask walls. The catalyst was nominally 19 wt % methylalumoxane, 0.60 wt % zirconocene (0.13 wt % ZR), and 51 wt % polyethylene. Since catalyst E was prepolymerized to about 204% of its original weight, this is labeled PP(204)EINDZ in the Table.

EXAMPLES 1–9, 11–18

Polymerization

A clean, dry one liter autoclave was flushed with propylene. The reactor was then charged with 500 mL of liquid propylene and a measured quantity of 25% TEAL in hexane was added by syringe. Hydrogen, if used, was added at this point. Thereafter, the liquid propylene was brought to the temperature for reaction, where the pressure in the autoclave was measured. The pressure in the reactor was then increased by a measured incremental pressure by addition of ethylene. To start the run, a measured quantity of the supported catalyst injected as a slurry in 3 ml of pentane was injected into the autoclave. Ethylene was supplied to maintain the initial total pressure in the autoclave. After reaction for the desired length of time, the monomers were flashed off, and the temperature was brought to 25 ° C. The polymer product was recovered from the reactor and dried in a vacuum oven at 50° C. overnight. Amounts and types of catalysts used and the results of the polymerizations are reported in the Table.

Discussion of Examples

Examples 1 and 2 in the Table illustrate the excellent activity and product molecular weight obtained with the unbridged bis(indenyl)zirconium dichloride based PP(346)INDZ catalyst prepared according to this invention. Examples 3 to 4 illustrate the control of product molecular weight by use of hydrogen or TEAL, allowing for the production of EPC with commercially useful Mooney viscosities in the range of 10–100 ($ML_{1+4}$, 125° C.).

For comparison, Examples 6 and 7 illustrate the performance of the dimethylsilanylene-bridged bis(tetrahydroindenyl)zirconium dichloride based catalyst described in my U.S. Pat. No. 4,871,705. This catalyst is in the class of zirconocene/alumoxane catalysts containing alkyl substituted (but not olefinic or aromatic substituted) cyclopentadienyl ligands which were found to be useful for making high molecular weight elastomers. In the absence of hydrogen, the catalyst of the present invention gives products with somewhat lower molecular weight than the catalyst in Examples 6 and 7, but still high enough for commercial applications. In contrast to the catalysts of my U.S. Pat. No. 4,871,705, the bridged analogues of the present invention do not provide high molecular weight products under the conditions of the slurry polymerization used for these examples. This is illustrated by the comparative examples 8 and 9 in the Table, which also shows the much lower activity obtained with the dimethylsilanylene- and ethylene-bridged bis(indenyl)zirconium dichloride based catalysts.

Definitions for Tables

Catalyst

| | |
|---|---|
| Zirc: | wt % zirconocene in the supported or prepolymerized catalyst |
| MAO: | wt % methylalumoxane in the supported or prepolymerized catalyst |
| mg: | weight of catalyst used in the run |
| 25% TEAL ml: | quantity of triethylaluminum (25 wt % in hexane) used as a scavenger or for molecular weight control |
| $C_2$ Psi: | incremental pressure of ethylene, above the vapor pressure of propylene, used for the run |
| T °C.: | reaction temperature |
| ΔT °C.: | magnitude of the temperature exotherm observed upon injection of catalyst |
| Yield g/min: | weight of polymer, after drying, recovered from the reaction/minutes of reaction |

Activity

| | |
|---|---|
| Kg/g-Zr/h: | Kg of polymer obtained per gram of zirconium per hour of reaction |

Productivity

| | |
|---|---|
| g/g-cat/h: | g of polymer obtained per gram of catalyst per hour of reaction |
| $C_2$ wt %: | weight % ethylene in the polymer product as per ASTM D3900 |
| $M_w$ $10^3$: | weight average molecular weight of the product as determined from DRI (in thousands) |
| MWD: | molecular weight distribution as expressed by the ratio of the weight average to number average molecular weights |
| $ML_{1+4}$, 125° C.: | Mooney viscosity as per ASTM D1646 |

TABLE I

Laboratory Propylene Slurry Polymerizations Using Prepolymerized Catalysts

| Example | Catalyst | Zirc | MAO | mg | 25% TEAL ml | $C_2$ psi | T °C. | ΔT °C. | Yield g/min | Activity Kg/g-Zr/h | Productivity g/g-cat/h | $C_2$ wt % | $M_w$ $10^3$ | MWD | ML 1+4, 125° C. |
|---|---|---|---|---|---|---|---|---|---|---|---|---|---|---|---|
| | | | | | | Invention Examples | | | | | | | | | |
| 1 | A:PP(346)INDZ | 0.57 | 13 | 100 | 0.2 | 150 | 45 | 1.2 | 40/12 | 1520 | 2000 | 73 | 217 | 2.52 | 94 |
| 2 | A:PP(346)INDZ | 0.57 | 13 | 100 | 0.2 | 200 | 35 | 0.8 | 44/23 | 870 | 1150 | 71 | 238 | 2.43 | 112 |
| | | | | | Examples of Molecular Weight Control: | | | | | | | | | | |
| 3[a] | A:PP(346)INDZ | 0.57 | 13 | 100 | 1.0 | 150 | 45 | 1.1 | 43/53 | 373 | 490 | 73 | 141 | 2.27 | 32 |
| 4[b] | A:PP(346)INDZ | 0.57 | 13 | 100 | 0.2 | 150 | 45 | 0.5 | 49/26 | 860 | 1130 | 67 | 171 | 2.48 | 49 |
| 5[c] | A:PP(346)INDZ | 0.57 | 13 | 100 | 0.2 | 150 | 45 | 0.2 | 35/50 | 250 | 430 | 60 | 108 | 2.65 | 10 |
| | | | | | | Comparative Examples | | | | | | | | | |
| 6 | B:PP(302)STHIZ | 0.65 | 12 | 100 | 0.1 | 250 | 40 | 0.8 | 62/30 | 950 | 1230 | 51 | 285 | 2.22 | 147 |
| 7 | C:PP(330)STHIZ | 0.61 | 11 | 100 | 0.1 | 250 | 40 | 0.5 | 58/30 | 940 | 1150 | 53 | 302 | 2.22 | 98 |
| 8 | D:PP(323)SINDZ | 0.61 | 12 | 200 | 0.2 | 250 | 40 | 0.1 | 45/98 | 110 | 138 | 42 | 52 | 2.81 | <10 |
| 9 | E:PP(204)EINDZ | 0.60 | 19 | 200 | 0.2 | 250 | 40 | 0.2 | 70/86 | 190 | 245 | 44 | 103 | 5.48 | <10 |

Note: used 500 mL propylene.
[a] used 1.0 ml of 25 wt % TEAL in hexane to reduce molecular weight
[b] used 0.85 mmol of hydrogen to reduce molecular weight
[c] used 1.7 mmol of hydrogen to reduce molecular weight

| Run | Zirconocene Catalyst Component |
|---|---|
| A | bis(indenyl)zirconium dichloride [INDZ] |
| B, C | dimethylsilanylene bridged bis(tetrahydroindenyl)zirconium dichloride [STHIZ] |
| D | dimethylsilanylene bridged bis(indenyl)zirconium dichloride [SINDZ] |
| E | ethylene bridged bis(indenyl)zirconium dichloride [EINDZ] |

Definitions for Tables

| | |
|---|---|
| Catalyst: | PP(nnn)INDZ is a (INDZ)ZrCl containing catalyst prepolymerized with ethylene to nnn % of its nonprepolymerized weight. |

EXAMPLE 10

Preparation of Prepolymerized Catalyst F

A clean, dry, glass catalyst preparation vessel of two gallon capacity was charged with 3L of 9.5 wt % Sherex MAO in toluene. 200 g of Davison 948 silica gel (which had been dried at 800° C. for 4 hours) was added, under nitrogen atmosphere, with good stirring by an anchor/helix combination stirrer. The reactor was heated to 50°–60° C., subjected to about 635 mm (25 inches) of mercury vacuum, and sparged with nitrogen from the bottom to help remove the toluene. After five hours, the solid $MAO/SiO_2$ was a dry, free-flowing powder. The reactor was then cooled to 28° C. and about 8 liters of dry isopentane was added. Next, 5.0 grams of bis(indenyl)zirconium dichloride slurried in 700 mL of toluene was added with good stirring over 10 minutes and the mixture was stirred for 15 minutes more. The reactor vent was blocked in and polymer grade ethylene was added from the bottom, with strong agitation, at a rate of about 7 g/min. The reactor pressure was maintained below about atm (15 psig) by cooling the reactor to maintain a temperature below 28° C. during addition. The total ethylene addition time was about 1 hours. About 20 minutes further stirring, the slurry was allowed to settle and the supernatant liquid was decanted. The slurry was washed by adding 4L of isopentane, stirring a few moments, letting the solids settle, and decanting. This was repeated twice more with 4L of isopentane. The slurry was then removed from the reactor, and collected in a dry box on a filter. The solids were washed on the filter three times with 2L of isopentane, dried by pulling nitrogen through the filter until no more liquids were obtained, and then dried under vacuum. A total of 815 grams of prepolymerized catalyst were obtained as a tan powder. This catalyst is identified as Catalyst F, and is nominally 0.61 wt % zirconocene (0.14 wt % Zr).

EXAMPLE 10

Polymerization

Catalyst F was used for a continuous polymerization in a 200 gallon autorefrigerated CSTR reactor. The reactor was maintained at 35° C. and about 34 atm to about 36 atm (510–530 psig), while adding about 52 kg/hr (115 lbs/hr) of propylene and maintaining pressure with ethylene added at about 41–45 kg/hr (about 90–100 lbs/hr). The gas phase ethylene concentration under these conditions was measured to be 63–65 mol % and the nominal residence time was 2 hours. The catalyst was added to the reactor as an 18 wt % slurry in mineral oil at a rate of 200 mg/min (37 mg/min, dry catalyst weight). The other feeds were 15 cc/min of 2 wt % TEAL in isopentane (scavenger) and hydrogen at about 0.5 g/hr (adjusted to maintain desired hydrogen level in reactor gas phase). Product granules of EP were removed from the reactor on level control via solenoid valve-controlled letdown to a section of tubing near the bottom of the reactor. From the tubing section, the product slurry was flashed into a cyclone where the granules were separated from the ethylene and propylene gases. The product was finished by melting and extrusion as pellets. A total of 608 lbs of EP was obtained during 55.5 hrs of operation, for an average production rate of 11 lbs per hour, and average catalyst productivity of 2250 g-EP/g-cat, which is equivalent to 1125 g-EP/g-cat/hr, or about 800 Kg-EP/g-Zr/hr.

The product was 70–72 wt % ethylene. Molecular weight was controlled by addition of very small amounts of hydrogen to the reactor. With hydrogen in the vapor phase ranging from 500 to 250 mppm, products were obtained with Mooney viscosities ranging from 42 to 66 ($ML_{1+4}$, 125° C.).

This example illustrates the use of the catalyst of this invention in a continuous polymerization process. The bis-(indenyl)zirconium dichloride based catalyst produces high quality EP which meets the needs of the rubber industry.

Analysis of the EP produced by the bis(indenyl)zirconium dichloride derived catalyst has revealed that the product is significantly different from that produced by the dimethylsilanylene-bridged-bis(tetrahydroindenyl)zirconium dichloride derived catalysts described in our U.S. Pat. No. 4,871,705 and 5,001,205. The reactivity for ethylene incorporation is much higher than that for propylene. A consequence of this high reactivity ratio is a broader compositioned distribution for the products of this invention than for those previously described. This is due to preferential reaction of ethylene in the particles which is faster than diffusion can maintain equilibrium. In the growing particles of EP there is a lower ethylene/propylene feed ratio at sites in larger particle sizes and at sites farther from the particle surface. Thus the incorporation of ethylene into the polymer is less at longer reaction times.

Figure 1:
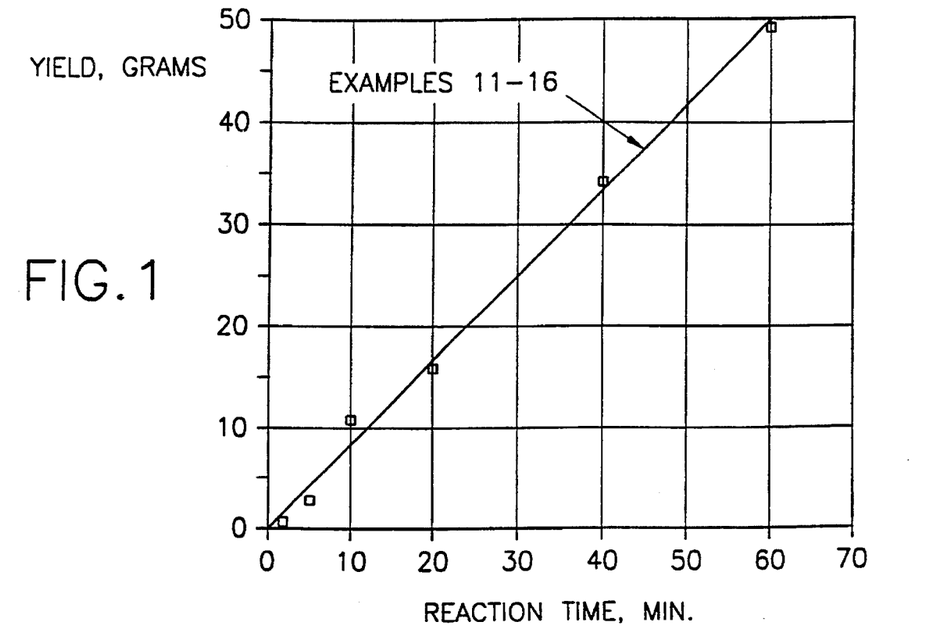
FIG. 1 is a graphic presentation of Yield v. Reaction Time, Ex. 11–16.
Figure 2:
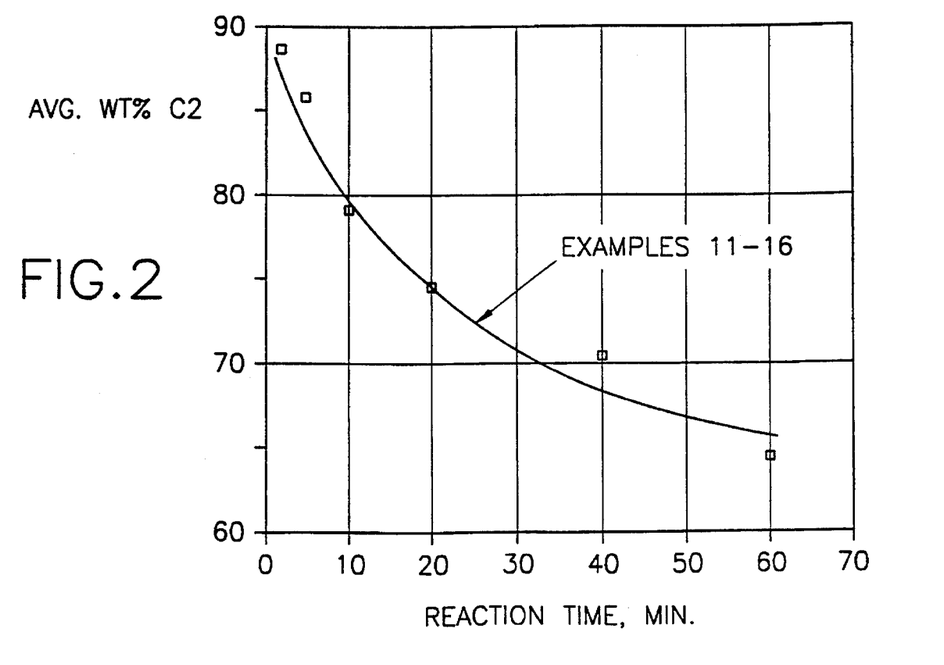
FIG. 2 is a graphic presentation of Average wt. % $C_2$v. Reaction Time, Ex. 11–16.
Figure 3:
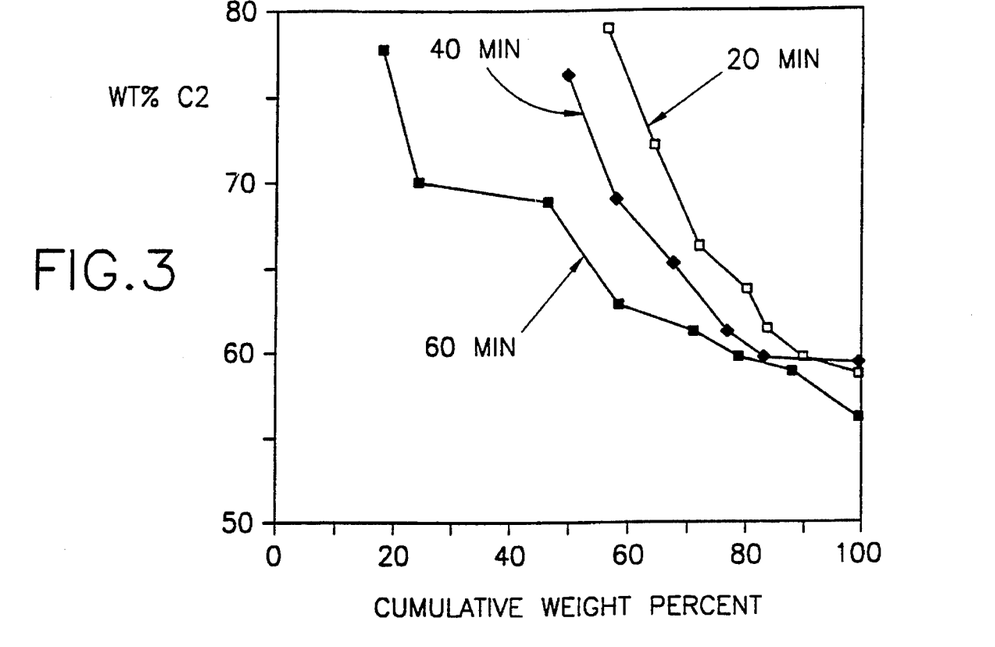
FIG. 3 is a graphic presentation of wt. % $C_2$v. Cumulative wt. %, Ex. 14–16.
Figure 4:
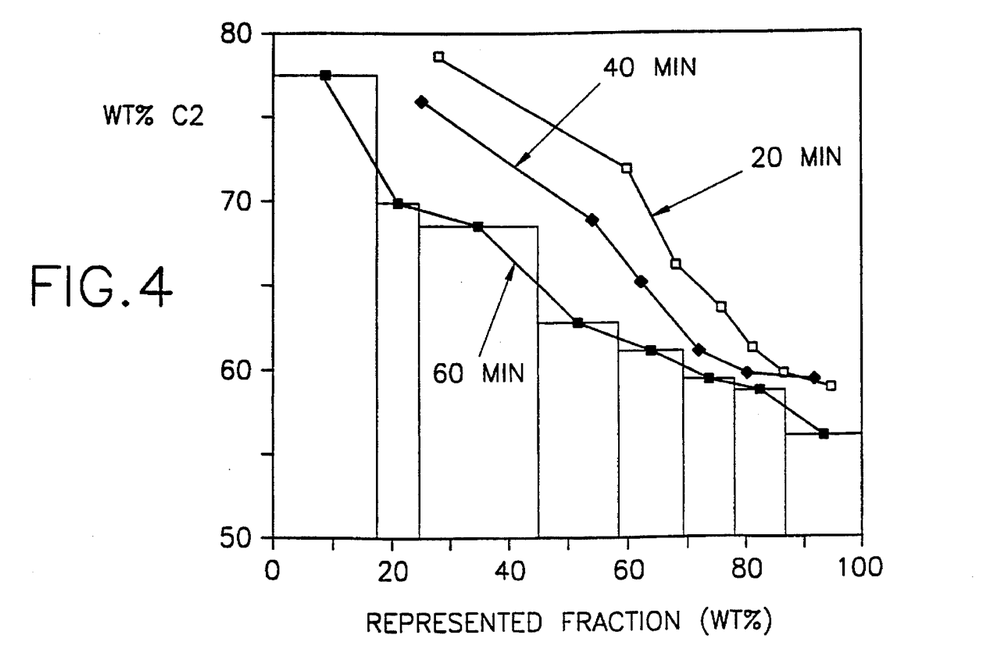
FIG. 4 is a graphic presentation of Ethylene Content Distribution Profiles.
Figure 5:
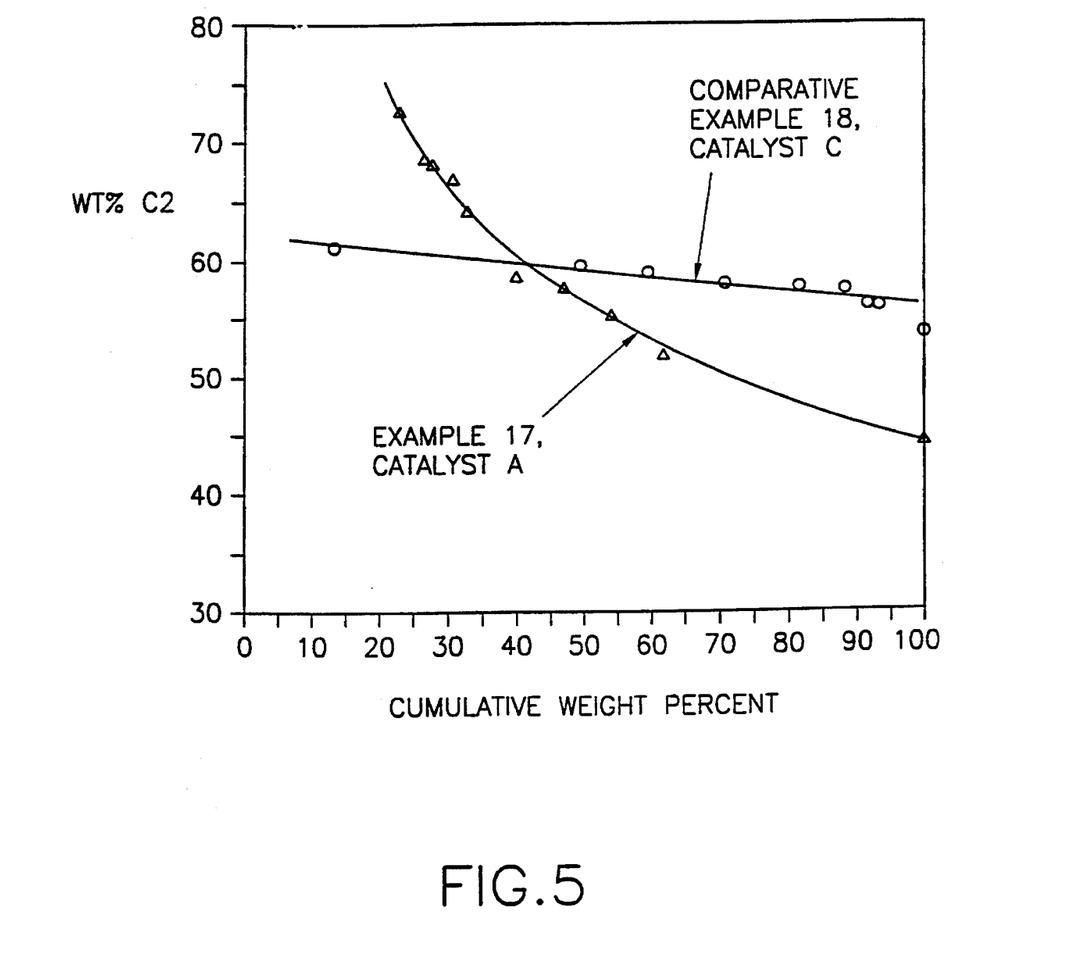
FIG. 5 is a graphic presentation of Compositional Distribution, Ex. 17–18.

This can be seen in several results. FIGS. 1 and 2 show that under the same conditions of polymerization with Catalyst A, except for total reaction time, the yield is proportional to reaction time, but the average ethylene content of the product drops from about 89 wt % after five minutes to 64 wt % after 60 minutes (Examples 11–16). A second indication is shown in FIGS. 3 and 4, where the distribution of ethylene composition of the products after 20, 40 and 60 minutes (as determined by stepwise precipitation from cyclohexane solution with isopropanol) is plotted. For comparison, such broad distributions are not found in products from conventional soluble single-species vanadium catalysts (which typically show less than 1% compositional variation), nor from the dimethylsilanylene-bridged-bis(tetrahydroindenyl)zirconium dichloride derived catalysts of our previous patents. This is illustrated in FIG. 5, which shows the compositional distribution of products with the same average ethylene content (59%) made from both Catalyst A (Example 17) and Catalyst C (Comparative Example 18).

One advantage of the broad compositional distribution of the current invention is that products can be obtained from slurry polymerization with less agglomeration and fouling. The higher ethylene composition at the surface of the growing particles is semicrystalline and helps prevent agglomeration. A disadvantage is the higher average crystallinity of the product relative to conventionally solution produced EP from vanadium catalysts, but the higher crystallinity is not a problem in many applications and may be useful in certain applications requiring green strength.

TABLE II

Additional Examples from Laboratory Slurry Polymerizations

| Example | Catalyst | 25% TEAL mL | $C_2$ Press psig | Temp. °C. | ΔT °C. | Time min | Yield g | $C_2$ wt % |
|---|---|---|---|---|---|---|---|---|
| 11 | A | 0.2 | 150 | 50 | 0.4 | 2 | 0.9 | 89.0 |
| 12 | A | 0.2 | 150 | 50 | 0.0 | 5 | 2.3 | 86.2 |
| 13 | A | 0.2 | 150 | 50 | 1.8 | 10 | 10.8 | 79.4 |
| 14 | A | 0.2 | 150 | 50 | 0.5 | 20 | 15.6 | 74.9 |
| 15 | A | 0.2 | 150 | 50 | 1.5 | 40 | 34.5 | 70.5 |
| 16 | A | 0.2 | 150 | 50 | 2.0 | 60 | 48.9 | 64.4 |
| 17 | A | 0.2 | 100 | 55 | 0.3 | 60 | 46.4 | 58.5 |

TABLE II-continued

Additional Examples from Laboratory Slurry Polymerizations

| Example | Catalyst | 25% TEAL mL | $C_2$ Press psig | Temp. °C. | ΔT °C. | Time min | Yield g | $C_2$ wt % |
|---|---|---|---|---|---|---|---|---|
| 18 | C | 0.1 | 350 | 50 | 1.0 | 30 | 60.5 | 59.0 |

While all test examples were performed using an alumoxane cocatalyst, the metallocene catalyst, particularly the alkylated forms, should accomplish similar results when incorporated into an ionic catalyst system or when any other suitable activator is used. Such ionic activators include, for example, those now known in the art such as those described in EP A 277 003, EP A 277 004, and U.S. Pat. No. 5,153,157 which are incorporated by reference.

Such catalyst systems, either with cocatalysts or ionic activators, will also be functional when supported on an inert medium including those described in U.S. Pat. Nos. 5,240,894, 5,006,500, 4,808,561 and 5,124,418, all of which are incorporated by reference.

The scope of this invention is to be interpreted to include those modifications of the catalyst system.

Although the invention has been described with reference to its preferred embodiment, those of ordinary skill in the art may appreciate different modes for practice which do not depart from the scope and spirit of the invention as described above or claimed hereafter.

I claim:

1. A process for producing an ethylene/α-olefin elastomeric copolymer in slurry polymerization, comprising the steps of: adding an α-olefin monomer in which an ethylene/α-olefin elastomeric copolymer is not soluble to a reaction vessel in an amount and under pressure sufficient to allow utilization of said α-olefin in liquefied form as a polymerization diluent;

adding ethylene to said α-olefin monomer polymerization diluent in an amount sufficient to maintain a desired ethylene/α-olefin ratio in the liquid phase of the reaction vessel and;

adding to the mixture of monomers a metallocene/alumoxane catalyst system wherein the metallocene component of the catalyst is of the formula:

where M is zirconium, titanium, or hafnium; each $R^1$ and $R^2$ independently is a $C_1$ to $C_{20}$ linear or branched alkyl; X is a halide, hydride, alkyl, or aryl; and "y" and "z" are independently integer numbers of 0, 1 or 2;

reacting the mixture of olefin monomers for a time sufficient to permit copolymerization of said ethylene and α-olefin monomers to an ethylene/α-olefin elastomeric copolymer, wherein said process has less agglomeration and fouling than the process using bridged metallocene catalysts.

2. The process of claim 1, wherein M is zirconium and said metallocene/alumoxane catalyst system is present on a catalyst support material.

3. The process of claim 2, wherein said catalyst support material is a silica gel with methylalumoxane.

4. The process of claim 2, wherein the α-olefin monomer is propylene.

5. The process of claim 1, wherein the metallocene is a bis(indenyl)zirconium dihalide.

6. The process of claim 1, wherein the metallocene is a bis(indenyl)zirconium dialkyl.

7. The process of claim 3, wherein "y" and "z" are 0.

8. The process of claim 7, wherein the catalyst has a mole ratio of aluminum to zirconium in the range of 10 to 5,000.

9. The process of claim 8, wherein the α-olefin is propylene, 1-butene or a mixture thereof.

10. The process of claim 4, wherein the temperature for polymerization is in the range of 0°–80° C.

11. A process for producing an ethylene/α-olefin elastomeric copolymer in slurry polymerization, comprising the steps of:

adding an α-olefin monomer to a reaction vessel in an amount and under a pressure sufficient to allow utilization of said α-olefin in a liquefied state as a polymerization diluent;

adding ethylene to said α-olefin polymerization diluent in an amount sufficient to maintain a desired ethylene/α-olefin ratio in the liquid phase in the reaction vessel, and;

adding to the mixture of monomers a supported metallocene/alumoxane catalyst complex which has been prepolymerized with ethylene or an α-olefin to a weight increase of at least 50% based on the total weight of the catalyst and support material wherein the catalyst support is an alumoxane treated inorganic oxide and the metallocene component of the catalyst is of the formula:

where M is zirconium, titanium, or hafnium; each $R^1$ and $R^2$ is independently a $C_1$ to $C_{20}$ linear or branched alkyl; each X independently is a halide, hydride, alkyl, or aryl; and "y" and "z" are independently integers of 0, 1 or 2;

reacting the mixture of olefin monomers for a time sufficient to permit copolymerization of said ethylene and α-olefin monomers to an ethylene/α-olefin elastomeric copolymer, wherein said process has less agglomeration and fouling than the process using bridged metallocene catalysts.

12. The process of claim 11, wherein the catalyst support is silica gel and said alumoxane is methylalumoxane.

13. The process of claim 12, wherein the 60-olefin is propylene.

14. The process of claim 12, wherein the temperature for polymerization is in the range of 0°–80° C.

15. The process of claim 14, wherein M is zirconium.

16. The process of claim 15, wherein "y" and "z" are 0.

* * * * *